(12) United States Patent
Foster

(10) Patent No.: US 6,760,428 B2
(45) Date of Patent: *Jul. 6, 2004

(54) MODIFICATION OF VOICE PROMPTING BASED ON PRIOR COMMUNICATION IN A CALL CENTER

(75) Inventor: Robin H. Foster, Little Silver, NJ (US)

(73) Assignee: Avaya Technology Corp., Basking Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/364,434

(22) Filed: Jul. 30, 1999

(65) Prior Publication Data

US 2003/0206622 A1 Nov. 6, 2003

(51) Int. Cl.[7] .............................. G06F 13/00; H04Q 3/64
(52) U.S. Cl. ............................ 379/265.09; 379/265.02; 379/265.12; 379/265.13
(58) Field of Search ..................... 379/265.01, 265.02, 379/265.03, 265.05, 265.09, 265.1, 265.11, 265.12, 265.13, 265.14, 266.01, 266.02, 266.03, 266.05, 88.13, 88.19, 142.01, 142.06, 305

(56) References Cited

U.S. PATENT DOCUMENTS

| 3,556,530 A | * | 1/1971 | Barr .......................... 273/139 |
| 4,623,761 A | | 11/1986 | Winter et al. |
| 5,206,903 A | | 4/1993 | Kohler et al. |
| 5,544,232 A | | 8/1996 | Baker et al. |
| 5,721,770 A | | 2/1998 | Kohler |
| 5,793,861 A | | 8/1998 | Haigh |
| 5,793,972 A | * | 8/1998 | Shane .................... 395/200.49 |
| 5,825,869 A | | 10/1998 | Brooks et al. |
| 5,883,940 A | | 3/1999 | Thornton |
| 5,917,903 A | | 6/1999 | Jolissaint |
| 6,018,761 A | * | 1/2000 | Uomini ...................... 395/200 |
| 6,058,435 A | * | 5/2000 | Sassin et al. ............... 379/265 |
| 6,175,823 B1 | * | 1/2001 | Van Dusen ............ 395/400.49 |
| 6,298,128 B1 | * | 10/2001 | Ramey et al. ......... 379/142.01 |
| 6,327,343 B1 | * | 12/2001 | Epstein et al. ........... 379/88.01 |
| 6,449,356 B1 | * | 9/2002 | Dezonno ............... 379/265.01 |
| 6,459,776 B1 | * | 10/2002 | Aktas et al. ............. 379/88.13 |

* cited by examiner

Primary Examiner—William J. Deane, Jr.
(74) Attorney, Agent, or Firm—Ryan, Mason & Lewis, LLP

(57) ABSTRACT

A call center is configured such that voice prompts provided to a given caller are modified based on prior e-mail notifications or other non-telephonic communications between the call center and that caller. In an illustrative embodiment, information regarding at least one previous non-telephonic communication with a given caller is stored in a database or other memory accessible to the call center. When the given caller places a subsequent call to the call center, the call center retrieves the stored information for that caller, and selects voice prompts for the caller based at least in part on the e-mails or other non-telephonic communications previously sent to the caller. The call is then routed to an appropriately-skilled agent based at least in part on a response of the caller to the voice prompt. Additional information relating to the previous non-telephonic communication, e.g., a copy or summary of the communication, may be transmitted to the agent that receives the call.

17 Claims, 2 Drawing Sheets

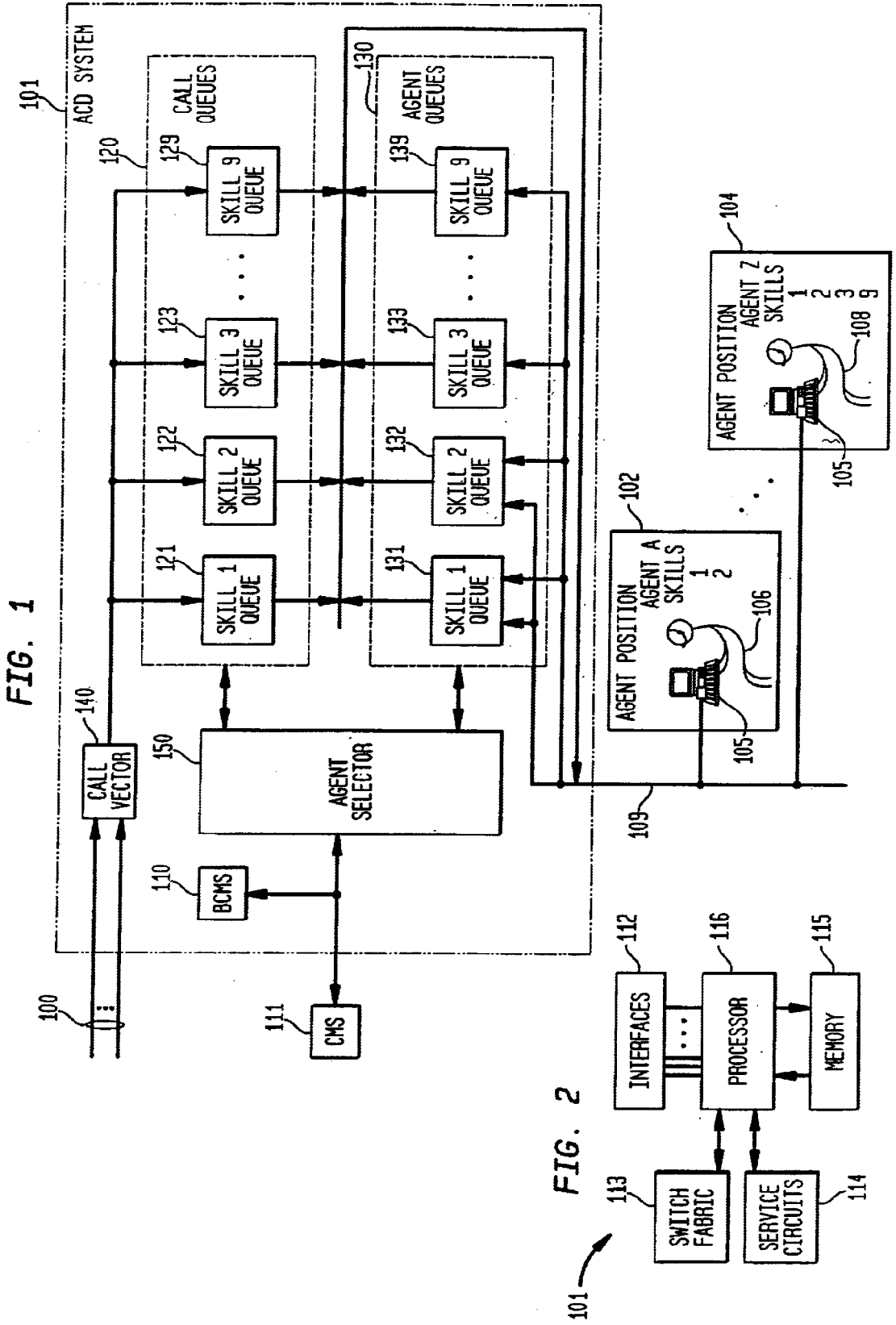

MODIFICATION OF VOICE PROMPTING BASED ON PRIOR COMMUNICATION IN A CALL CENTER

FIELD OF THE INVENTION

The invention relates generally to call centers or other call processing systems in which voice Calls, e-mails, faxes, voice messages, text messages, Internet service requests or other types of Communications are distributed among a number of service agents for handling.

BACKGROUND OF THE INVENTION

Call centers distribute calls and other types of communications to available call-handling Service agents in accordance with various predetermined criteria. In existing systems, the criteria for handling a call are often programmable by the operator of the system via a capability known as Call vectoring. Typically, when the system detects that an agent has become available to handle a call, the system identifies the call-handling skills of the agent, usually in some order of priority, and Delivers to the agent the longest-waiting call that matches the agent's highest-priority skill. Most Conventional call distribution techniques generally focus on being "fair" to callers and agents. This Fairness is reflected by the standard first-in, first-out call queuing and most-idle-agent call Assignment process. The above-noted skills-based queuing improves upon this basic process in that it allows each agent to be placed into a number of different service categories based on the skill types supported by that agent.

The above-described conventional call centers may also be capable of communicating with customers via e-mail. Outbound e-mail from such a call center may include both reactive e-mail, e.g., answers to questions the customer has sent in, and proactive e-mail, e.g., notification of available products or services, changing interest rates, free seminars, etc. A recipient of an e-mail message from a call center may respond to that e-mail via a return e-mail, or may decide to place a call to the call center. A significant drawback of conventional call centers is that such centers generally do not incorporate knowledge of an e-mail message recently sent to a customer in the voice announcements or other types of voice prompting that the customer hears when calling subsequent to receipt of the e-mail message.

It is therefore apparent that a need exists for improved techniques for generating voice prompts for callers accessing a call center, such that the information provided to those callers can be more appropriately tailored to their needs than would otherwise be possible using conventional techniques.

SUMMARY OF THE INVENTION

The invention modifies voice announcements or other types of voice prompting in a call center based on prior e-mail messages or other non-telephonic communications with callers. In the illustrative embodiment, information regarding at least one previous non-telephonic communication with a given caller is stored in a database or other memory accessible to a call center. The previous non-telephonic communication may be, e.g., a proactive e-mail, facsimile or mail notification previously sent by the call center to the caller without any corresponding request from the caller, or a reactive e-mail, facsimile or mail notification sent by the call center to the caller in response to a particular caller request. When the given caller places a subsequent call to the call center, the call center retrieves the stored information for that caller, and selects voice prompts for the caller based at least in part on the e-mails or other non-telephonic communications previously sent to the caller. The call is then routed to an appropriately-skilled agent based at least in part on a response of the caller to the voice prompt. Additional information relating to the previous non-telephonic communication, e.g., a copy or summary of the communication, maybe transmitted to the agent that receives the call.

Advantageously, the invention allows a call center to incorporate knowledge of e-mails or other non-telephonic communications recently sent to a customer or other caller in selecting the voice announcements or other types of voice prompting that the customer hears when making a subsequent call to that call center. The information provided to customers can thus be more appropriately tailored to their needs than would otherwise be possible using conventional techniques. Moreover, the invention also allows the call center to be more responsive to customers, provides market information regarding how frequently customers respond to e-mail notification offers, reduces the amount of time a customer must spend in listening to voice prompts, provides a more exact matching of customer need to agent skill, and provides more useful information to an agent handling a voice call. These and other features and advantages of the present invention will become more apparent from the accompanying drawings and the following detailed description.

BRIEF DESCRIPTION OF THE DRAWINGS

FIG. 1 is a block diagram of a call center that incorporates an illustrative embodiment of the invention.

FIG. 2 is a block diagram of the automatic call distribution (ACD) system implemented in the call center of FIG. 1.

DETAILED DESCRIPTION OF THE INVENTION

Figure 3:
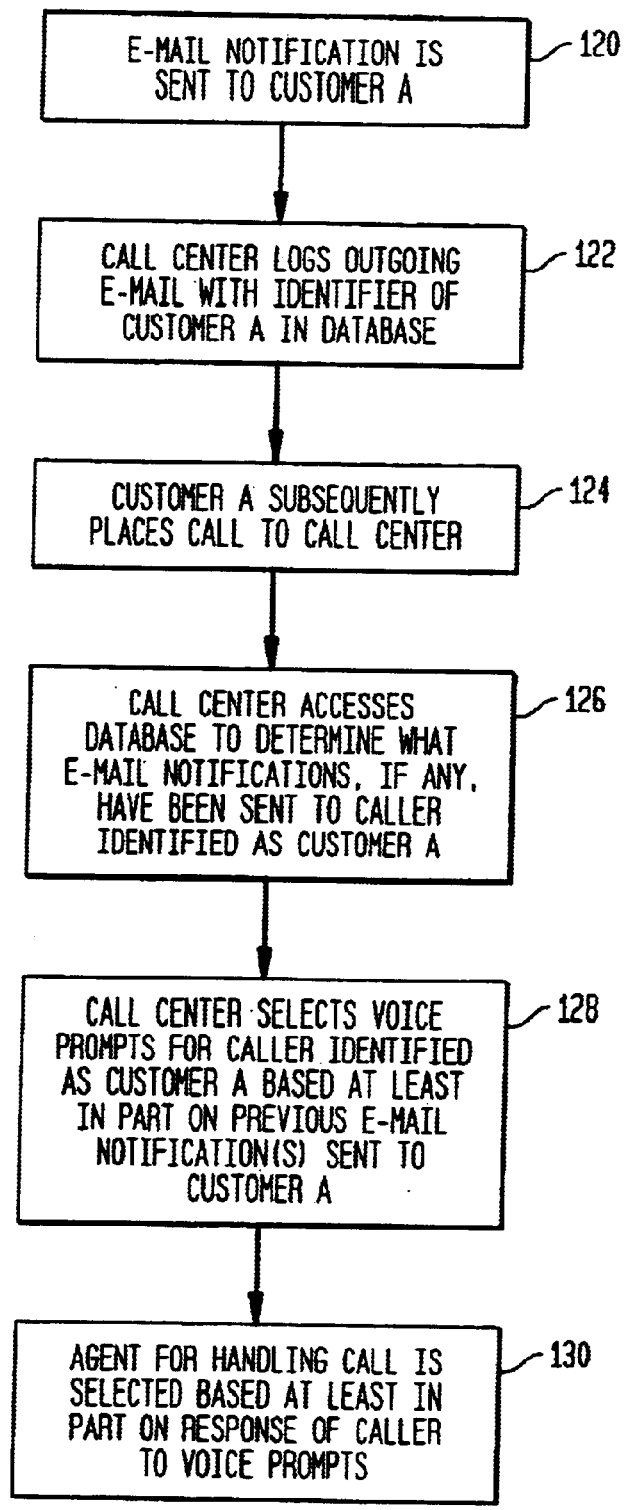
FIG. 3 is a flow diagram illustrating modification of voice prompting in the call center of FIG. 1 based on prior non-telephonic communication, in accordance with the invention.

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be can be used with automatic call distribution (ACD) systems, telemarketing systems, private-branch exchange (PBX) systems, computer-telephony integration (CTI)-based systems, as well as in combinations of these and other types of call centers. The term "call center" as used herein is thus intended to include any type of ACD system, telemarketing system or other communication system which processes calls or other service requests, including voice calls, video calls, multimedia calls, e-mail, faxes or voice messages as well as various combinations of these and other types of communications. The terms "voice prompting" and "voice prompts" as used herein are intended to include any type of audibly-perceptible information, including announcements, questions, directions, statements, etc., that may be presented to a caller accessing a call center. The term "non-telephonic communication" as used herein is intended to include any type of communication other than a voice telephone call, such as, for example, an e-mail communication, a facsimile communication, a data communication, a letter or other type of mailing sent via postal system, etc.

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric and to provide automatic call distribution functionality.

Referring again to FIG. 1, exemplary data elements stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels. Call vectoring is described in greater detail in Definity® Communications System Generic 3 Call Vectoring/Expert Agent Selection (EAS) Guide, AT&T Publication No. 555-230-520, Issue 3, November 1993, which is incorporated by reference herein. Skills-based ACD techniques are described in greater detail in, for example, U.S. Pat. No. 5,206,903, which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system. Further details regarding call processing in a system such as ACD system 101 can be found in, for example, U.S. patent application Ser. No. 08/813,513 filed Mar. 7, 1997 and entitled "Waiting Call Selection Based on Anticipated Wait Times," and U.S. patent application Ser. No. 09/022,959 filed Feb. 12, 1998 and entitled "Call Center Agent Selection that Optimizes Call Wait Times," both of which are incorporated by reference herein.

In accordance with the invention, the call center of FIG. 1 includes a capability for modification of voice prompting for a given caller based on e-mail messages, facsimiles or other non-telephonic communications previously sent to that caller. FIG. 3 shows a flow diagram of an illustrative embodiment of the invention in which the caller is a customer of a business which operates or is otherwise associated with the call center. In step 120, an e-mail notification is sent to a particular customer, i.e., customer A. The call center logs in a reference database its outbound email by customer identifier such as automatic number identifier (ANI), account number, or other suitable identifier typically used to identify voice callers, as shown in step 122 for customer A. Such a database may be implemented in whole or in part in memory 115 of FIG. 2, or in another type of internal or external memory which is part of or otherwise accessible to the call center, or in portions or combinations of these and other type of memory. The reference database thus associates particular customer identifiers with particular e-mail messages sent to those customers by the call center. The reference database is available for access through, e.g., computer-telephony integration (CTI) techniques or other well-known techniques, when incoming calls are processed by the call center.

In step 124, customer A places a call to the call center, subsequent to the logging of the previous outgoing e-mail notification in step 122. As shown in step 126, upon receiving the call from customer A, as identified by ANI, account number or other identifier, the call center accesses the reference database to determine which e-mail messages, if any, have been recently sent to that caller. The call center then uses this information to modify the announcements or other voice prompts that are played to that caller during the current call. More particularly, step 128 indicates that the call center selects voice prompts for the caller identified as customer A based at least in part on the previous e-mail notification sent to customer A. Step 130 indicates that an agent may then be selected for handling the incoming call from customer A, based at least in part on a response of customer A to the voice prompts.

As an example, assume that customer A is a customer of a bank or other financial institution, and that this customer had requested automatic notification via e-mail if the interest rate for a 30 year fixed-rate mortgage falls below 7%. Assume further that the interest rate does in fact fall below 7%, and the bank sends customer A the requested notification via e-mail, as per step 120 of FIG. 3. This e-mail may tell the customer, e.g, that the customer can go to the bank's web site to submit an application, or that the customer can apply over the telephone by calling a certain number. Assume that customer A chooses to apply over the telephone by calling the number. In accordance with the invention, a customer identifier is logged in the above-noted reference database when the e-mail notification is sent to customer A, as shown in step 122. The reference database thus stores the customer identifier and an indication of the type of e-mail message that was previously sent to that customer.

When customer A later calls in, as per step 124, the call center in step 126 retrieves the stored customer identifier and corresponding e-mail message indication, and in step 128 alters the voice prompts for that customer. In the present example, customer A may hear the following voice prompt: "Thank you for calling XYZ bank. If you are responding to our e-mail notification on interest rates for 30 year mortgages, press or say 1. For other services, press or say 2." If the information stored in the reference database indicates that customer A has received multiple e-mails from the bank recently, the bank call center might alter the voice prompts based on only the two or three most recent e-mails, or on some other reasonable maximum number.

The customer's response to the prompting reveals if, in fact, they are calling in response to the e-mail. The call can then be routed to an appropriately skilled agent, as per step 130 of FIG. 3. A copy or summary of the e-mail notification could also be incorporated into a screen-pop that accompanies the call when delivered to a particular agent position. Any other information relating to the e-mail, e.g., files relating to or describing the reason why the e-mail was sent, may also be delivered to the agent that receives the call. For example, the customer may have completed an online loan application at some time in the past, but did not want to execute the application until interest rates had dropped.

Modification of voice prompting in accordance with the invention may be implemented, e.g., by processor 116 of FIG. 2 using program instructions and other information stored in the memory 115. In other embodiments of the invention, other elements of the FIG. 1 call center or any other type of call center may be used to provide modification of voice prompting in accordance with previously-transmitted e-mails or other types of non-telephonic communications.

The invention provides a number of advantages over conventional techniques. For example, the invention in the illustrative embodiment allows the call center to be more responsive to the customer, provides market information regarding how frequently customers respond to e-mail notification offers, reduces the amount of time a customer must spend in listening to prompts, provides a more exact matching of caller need to agent skill, and provides more useful information to an agent handling an incoming voice call.

The above-described embodiment of the invention is intended to be illustrative only. For example, it should be noted that the exemplary configuration of the call center shown in FIG. 1 may be altered to incorporate a wide variety of different arrangements of components to provide the voice prompt modification and agent selection functions described herein. In addition, as previously noted, the invention can be applied to a wide variety of communications other than calls, including faxes and e-mails. It should be noted that the invention may be implemented in the form of a computer-readable medium or other similar medium containing software which, when executed by a computer or other type of processor, will cause the processor to implement the processing functions described above. For example, the BCMS 110, call vector 140, agent selector 150 and other elements of ACD system 101 may each be implemented at least in part as one or more software programs stored in memory 115 or any other computer readable medium associated with the ACD system 101, and executed by processor 116 or other processing hardware associated with the ACD system 101. A variety of other implementations may also be used to provide modification of voice response prompting in accordance with the invention. These and numerous other alternative embodiments within the scope of the following claims will be apparent to those skilled in the art.

What is claimed is:

1. A method of generating voice prompts for a caller accessing a call center, the method comprising the steps of:

storing information regarding at least one previous non-telephonic electronic communication initiated by the call center and directed from the call center to the caller, the stored information comprising: (i) previous communication identification information suitable for identifying the previous non-telephonic communication initiated by the call center and directed from the call center to the caller, and (ii) voice call identification information suitable for identifying a subsequent voice call from the caller as being associated with that particular caller; and selecting at least one voice prompt for delivery to the caller during a subsequent voice call initiated by the caller and directed from the caller to the call center based at least in part on the stored information regarding the previous non-telephonic communication;

the stored information being utilized to identify at least an initial voice prompt without requiring the caller to enter any information relating to the previous non-telephonic electronic communication;

wherein the call center automatically determines the initial voice prompt by deriving voice call identification information from the subsequent voice call, matching the derived voice call identification information to the stored voice call identification information, retrieving the previous communication identification information associated with the stored voice call identification information, and determining the initial voice prompt as a prompt appropriate for a recipient of the previous non-telephonic electronic communication identified by the previous communication identification information.

2. The method of claim 1 wherein the non-telephonic communication comprises an e-mail message previously sent by the call center to the caller.

3. The method of claim 1 wherein the non-telephonic communication comprises a facsimile communication previously sent by the call center to the caller.

4. The method of claim 1 wherein the non-telephonic communication comprises a proactive communication previously sent by the call center to the caller without the caller having previously requested the information in the communication.

5. The method of claim 1 wherein the non-telephonic communication comprises a reactive communication previously sent by the call center to the caller in response to an information request previously made by the caller.

6. The method of claim 1 wherein the selecting step is based on a maximum designated number of previous non-telephonic communications if the given caller has received more than the maximum number of non-telephonic communications.

7. The method of claim 1 further including the step of routing the call to a particular agent based at least in part on a response of the caller to the voice prompt.

8. The method of claim 1 further including the step of transmitting information relating to the previous non-telephonic communication to an agent that receives the call.

9. An apparatus for processing communications in a call center, the apparatus comprising:
   a memory for storing information regarding at least one previous non-telephonic electronic communication initiated by the call center and directed from the call center to a given caller, the stored information comprising: (i) previous communication identification information suitable for identifying the previous non-telephonic communication initiated by the call center and directed from the call center to the caller, and (ii) voice call identification information suitable for identifying a subsequent voice call from the caller as being associated with that particular caller; and
   a processor coupled to the memory and operative to select at least one voice prompt for delivery to the caller during a subsequent voice call initiated by the caller and directed from the caller to the call center based at least in part on the stored information regarding the previous non-telephonic communication;
   the stored information being utilized to identify at least an initial voice prompt without requiring the caller to enter any information relating to the previous non-telephonic electronic communication;
   wherein the call center automatically determines the initial voice prompt by deriving voice call identification information from the subsequent voice call, matching the derived voice call identification information to the stored voice call identification information, retrieving the previous communication identification information associated with the stored voice call identification information, and determining the initial voice prompt as a prompt appropriate for a recipient of the previous non-telephonic electronic communication identified by the previous communication identification information.

10. The apparatus of claim 9 wherein the non-telephonic communication comprises an e-mail message previously sent by the call center to the caller.

11. The apparatus of claim 9 wherein the non-telephonic communication comprises a facsimile communication previously sent by the call center to the caller.

12. The apparatus of claim 9 wherein the non-telephonic communication comprises a proactive communication previously sent by the call center to the caller without the caller having previously requested the information in the communication.

13. The apparatus of claim 9 wherein the non-telephonic communication comprises a reactive communication previously sent by the call center to the caller in response to an information request previously made by the caller.

14. The apparatus of claim 9 wherein the selecting step is based on a maximum designated number of previous non-telephonic communications if the given caller has received more than the maximum number of non-telephonic communications.

15. The apparatus of claim 9 further including the step of routing the call to a particular agent based at least in part on a response of the caller to the voice prompt.

16. The apparatus of claim 9 further including the step of transmitting information relating to the previous non-telephonic communication to an agent that receives the call.

17. An article of manufacture containing one or more software programs which, when executed in a processor, cause the processor to perform the steps of:
   storing information regarding at least one previous non-telephonic electronic communication initiated by a call center and directed from the call center to a given caller, the stored information comprising: (i) previous communication identification information suitable for identifying the previous non-telephonic communication initiated by the call center and directed from the call center to the caller, and (ii) voice call identification information suitable for identifying a subsequent voice call from the caller as being associated with that particular caller; and
   selecting at least one voice prompt for delivery to the caller during a subsequent voice call initiated by the caller and directed from the caller to the call center based at least in part on the stored information regarding the previous non-telephonic communication;
   the stored information being utilized to identify at least an initial voice prompt without requiring the caller to enter any information relating to the previous non-telephonic electronic communication;
   wherein the call center automatically determines the initial voice prompt by deriving voice call identification information from the subsequent voice call, matching the derived voice call identification information to the stored voice call identification information, retrieving the previous communication identification information associated with the stored voice call identification information, and determining the initial voice prompt as a prompt appropriate for a recipient of the previous non-telephonic electronic communication identified by the previous communication identification information.

* * * * *